United States Patent
Zappa et al.

(10) Patent No.: US 9,230,238 B2
(45) Date of Patent: Jan. 5, 2016

(54) FAVORITES LIST SHARING (75) Inventors: Eric J. Zappa, Seattle, WA (US); Abdul Haadi Mohammed, Seattle, WA (US); Wendy Wenjing Wang, Redmond, WA (US); Jeffrey E. Steinbok, Redmond, WA (US); Joseph Andrew Bono, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 956 days.

(21) Appl. No.: 12/401,416

(22) Filed: Mar. 10, 2009

(65) Prior Publication Data

US 2010/0235788 A1 Sep. 16, 2010

(51) Int. Cl.
*G06F 3/0482* (2013.01)
*G06F 3/0484* (2013.01)
*G06Q 10/10* (2012.01)

(52) U.S. Cl.
CPC .............. *G06Q 10/10* (2013.01); *G06F 3/0482* (2013.01); *G06F 3/04842* (2013.01)

(58) Field of Classification Search
CPC .... G06Q 10/10; G06F 3/0482; G06F 3/04842
USPC .......................................... 715/748, 760, 840
See application file for complete search history.

(56) References Cited

U.S. PATENT DOCUMENTS

| | | | |
|---|---|---|---|
| 2004/0215718 A1* | 10/2004 | Kazmi et al. ................... | 709/203 |
| 2005/0198305 A1* | 9/2005 | Pezaris et al. .................. | 709/227 |
| 2006/0206480 A1 | 9/2006 | Heidloff et al. | |
| 2007/0033517 A1* | 2/2007 | O'Shaughnessy et al. | 715/501.1 |
| 2007/0043839 A1* | 2/2007 | Amadio et al. ................ | 709/222 |
| 2007/0060328 A1* | 3/2007 | Zrike et al. ......................... | 463/29 |
| 2007/0094096 A1* | 4/2007 | Hellal et al. ..................... | 705/26 |
| 2007/0233291 A1* | 10/2007 | Herde et al. ..................... | 700/91 |
| 2008/0027909 A1 | 1/2008 | Gang et al. | |
| 2008/0250332 A1* | 10/2008 | Farrell et al. ................... | 715/753 |
| 2008/0288494 A1* | 11/2008 | Brogger et al. .................... | 707/7 |
| 2009/0043754 A1* | 2/2009 | Faris et al. ......................... | 707/5 |
| 2009/0172565 A1* | 7/2009 | Jackson et al. ................. | 715/753 |
| 2009/0199106 A1* | 8/2009 | Jonsson et al. ................ | 715/744 |
| 2009/0307234 A1* | 12/2009 | Zrike et al. ...................... | 707/10 |
| 2010/0115596 A1* | 5/2010 | Horozov et al. ................... | 726/7 |
| 2010/0153867 A1* | 6/2010 | Scott et al. ..................... | 715/762 |

OTHER PUBLICATIONS

Boswell, Wendy., "Share2me", retrieved at<<http://websearch.about.com/od/dailywebsearchtips/qt/dnt0902.htm>>, Jan. 13, 2009, pp. 1-3.

(Continued)

*Primary Examiner* — Aaron Lowenberger
(74) *Attorney, Agent, or Firm* — Brian Webster; Kate Drakos; Micky Minhas (57) ABSTRACT

Techniques are described to share items from a favorites list. In an implementation, a list entry for a favorites list may be associated with content from a third party source by a first user. The favorites list may be presented in a webpage to display the list entry and the associated content to another user. A control operable to share the list entry with the other user may be exposed with the list entry. Responsive to operation of the control, the content and/or related data may be obtained from the third party source and data may be stored to associate the list entry including the obtained content with the other user. In at least some embodiments, the control is operable by a single-click to cause the sharing of the list entry.

20 Claims, 7 Drawing Sheets

(56) References Cited

OTHER PUBLICATIONS

Ibaraki, Stephen., "What's New in Windows Live", Social Media for China Business, retrieved at<<http://english.chinavalue.net/MiniBlog/What_s_New_in_Windows_Live.aspx>>, Dec. 17, 2008, pp. 1-6.

"Fire Mountain Gems and Beads", "Favorites Center", retrieved at<<http://www.firemountaingems.com/favorites/favoriteshelp.asp>>, Jan. 13, 2009, pp. 1-4.

"Business Wire", "MySpace Introduces 'Data Availability' with Landmark Launch Partners Yahoo!, eBay, Photobucket, and Twitter", retrieved at<<http://www.businesswire.com/portal/site/google/?ndmViewId=news_view&newsId=20080508006009&newsLang=en>>, May 8, 2008, pp. 1-6.

"KillerStartups", "Jookster.com—Find and Share Your Favorite Content", retrieved at<<http://www.killerstartups.com/Web20/jookster-com-find-and-share-your-favorite-content>>, Jan. 13, 2009, pp. 1-6.

\* cited by examiner

FAVORITES LIST SHARING

BACKGROUND

The popularity of social networking via online networking sites is ever increasing. One way that people use social networking sites is to share information such as recommendations, pictures, videos, notes, discussions, and so forth on personal pages.

Sometimes, a person may come across an item on a friend's page that they like and would like to include on their own page. Using a traditional approach, the person may copy the item to their computer, navigate away from the friend's page to their own page, and then upload the item to be included on the page. As such, it may be quite inconvenient and disruptive for the user to place an item from a friend's page on their own page using this traditional approach.

SUMMARY

Techniques are described to share items from a favorites list. In an implementation, a list entry for a favorites list may be associated with content from a third party source by a first user. The favorites list may be presented in a webpage to display the list entry and the associated content to another user. A control operable to share the list entry with the other user may be exposed with the list entry. Responsive to operation of the control, the content and/or related data may be obtained from the third party source and data may be stored to associate the list entry including the obtained content with the other user. In at least some embodiments, the control is operable by a single-click to cause the sharing of the list entry.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

One way that people use social networking sites is to share information such as recommendations, pictures, videos, notes, discussions, and so forth on personal pages. Sometimes, a person may come across an item on a friend's page that they would like to have on their own pages. Accordingly, the person may copy the item to their computer, navigate away from the friend's page to their own page, and then upload the item to be included on the page. Consequently, this traditional approach to sharing items may be quite inconvenient and disruptive for the user.

Techniques are described to share items from a favorites list. In an implementation, a list entry for a favorites list may be associated with content from a third party source by a first user. The favorites list may be presented in a webpage to display the list entry and the associated content to another user. A control operable to share the list entry with the other user may be exposed along with the list entry in the webpage. When the other user operates the control, the content may be obtained from the third party source. Then, data may be stored to associate the list entry including the obtained content with the other user.

For example, Steve may have social networking profile page through a service provider that includes a list of some of Steve's favorite things, such as music, movies, and books. Steve may author a list entry on this list by selecting items, typing in titles, and so forth. For instance, Steve may author an entry to include "U2" as one of his favorite bands. When authoring the "U2" entry, Steve may associate additional content with the entry through an affiliate provider. By way of example, Steve may obtain album artwork, band images, audio clips, descriptions, and/or other content from the affiliate provider to include with the "U2" entry. The "U2" entry including the association to content from affiliate provider may be stored in an account with the service provider that Steve uses to access his profile page.

When Steve's friend Tad navigates to Steve's profile page he may see Steve's favorites list including the "U2" entry. The "U2" entry may appear with a control, such as an "Add" button, that Tad may select to add a "U2" entry to his own favorites list. When Tad clicks on the "Add" button, a list sharing module may operate to obtain content associated by Steve with the "U2" entry from the affiliate provider. The list sharing module also creates a list entry that is associated with the obtained content in an account corresponding to Tad. In at least some embodiments, the control is operable by a single-click to cause operation of the list sharing module to share the "U2" entry. Moreover, the list sharing module may operate in the background so that Tad's interaction with Steve's profile page is not disrupted. In this manner, Tad is able to recreate the "U2" entry authored by Steve in his own favorites list including the associations to content made by Steve.

In the discussion that follows, a section entitled "Example Environment" describes an example environment and devices, which may be employed to provide favorites list sharing in various embodiments. Following this, a section entitled "Example Procedures" describes example techniques related to favorites list sharing in accordance with one or more embodiments. After that, a section entitled "List Sharing Implementation Examples" describes example devices modules, and user interfaces that may be configured to enable favorites list sharing. Last, a section entitled "Example Devices" is provided and describes example devices that can be used to implement one or more embodiments.

Example Environment

Figure 1:
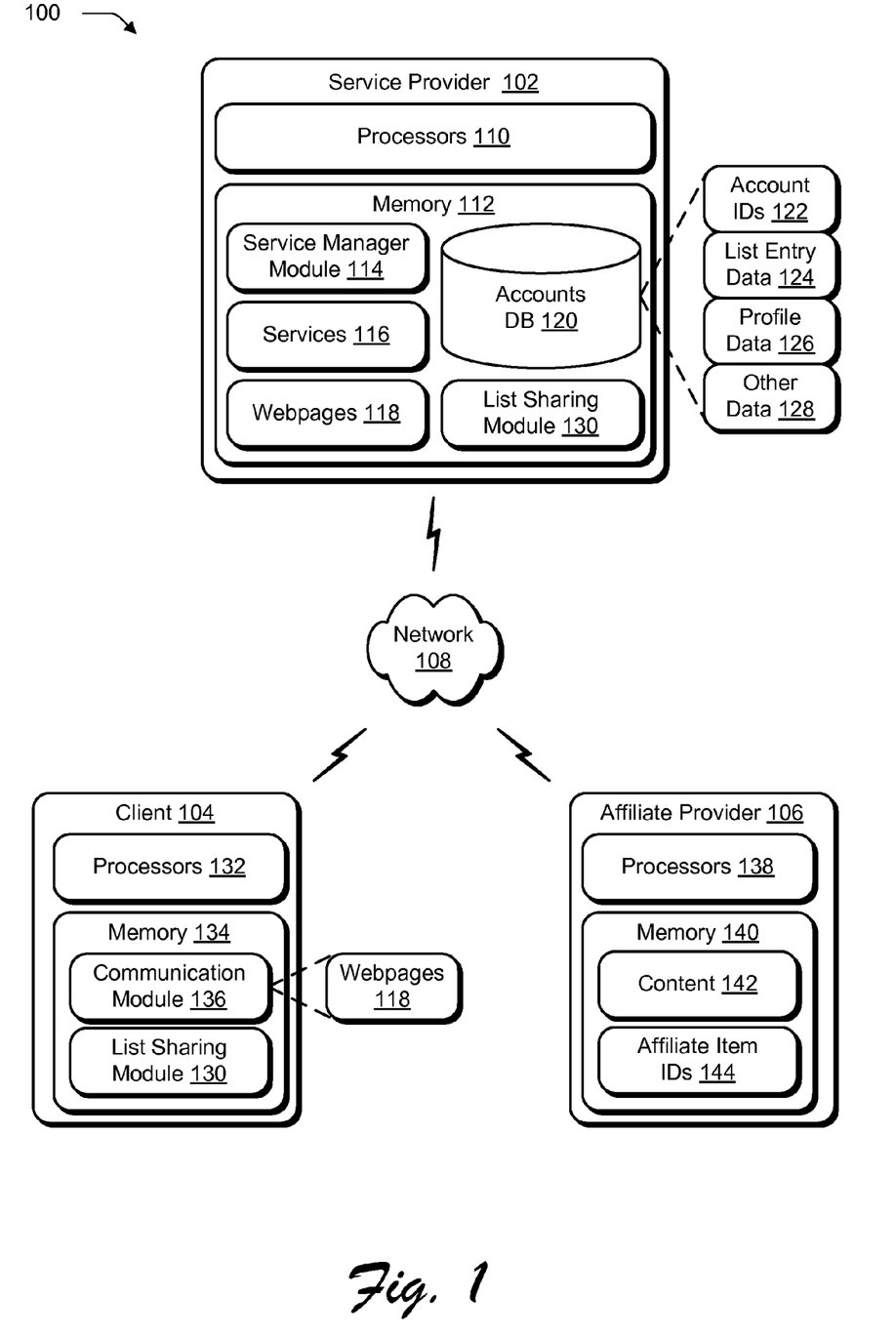
FIG. 1 is an illustration of an environment in an example implementation that is operable to provide favorites list sharing.

FIG. 1 is an illustration of an example environment 100 that is operable to provide favorites list sharing. The illustrated environment includes one or more service providers 102, one or more clients 104, and one or more affiliate providers 106, that are communicatively coupled, one to another, over a network 108. Although the network 108 is illustrated as the Internet, the network may assume a wide variety of configurations. For example, the network 108 may include a wide area network (WAN), a local area network (LAN), a wireless network, a public telephone network, an intranet, and so on. Further, although a single network 108 is shown, the network 108 may be configured to include multiple networks.

For the purposes of the following discussion, a referenced component, such as service provider 102, may refer to one or more entities, and therefore by convention reference may be made to a single entity (e.g., the service provider 102) or multiple entities (e.g., the service providers 102, the plurality of service providers 102, and so on) using the same reference number.

The service provider 102 may have one or more processors 110 and memory 112. Service provider 102 is depicted as storing a service manager module 114 in the memory 112 that is executable via the one or more processors 110. Service manager module 114 represents functionality operable by service provider 102 to manage various services 116 that may be made available over the network 108. For example, various services 116 may be provided via webpages 118, or other user interfaces, that are communicated over the network for output by the one or more clients 104. Service manager module 114 may manage access to the services 116, performance of the services 116, configuration of webpages 118 to provide the services 116, and so on.

Some examples of services 116 include, but are not limited to, a search service, an e-mail service to send and receive e-mail, instant messaging service to provide instant messages between clients 104, and a social network service to facilitate connections and interactions between groups of users who share common interests and activities. The social network service may assist users in connecting to a group, provide a variety ways for users to interact (e.g., group e-mail, website, blog, messaging) and provide recommendations to the groups based on shared interests and activities. In at least some embodiments, social network service may also be configured to enable creation and sharing of favorites lists in accordance with techniques described herein. Additional examples of services 116 include a shopping service, a weblog service, productivity service, authentication service, a news service, and an advertisement service, to name a few.

The authentication service may be provided by the service manager module 114 to authenticate clients to access various services 116 that may be provided by one or more of the service providers 102. For example, a client 104 may provide a username and password that is authenticated by the authentication service. When the authentication is successful, the authentication service may pass a token to enable access to corresponding services 116. Authentication of the client 104 to an account may provide access to a single corresponding service provider 102 and/or service 116. Additionally or alternatively, a single authentication may correspond to many services 116, such that authentication to a single account provides access to many service providers 102 and/or to an entire suite of services 116.

Service manager module 114 may also manage an accounts database 120 that may be configured to store a variety of data related to user accounts with the one or more service providers 102. By way of example and not limitation, accounts database 120 is depicted as storing account identifiers 122 that may be used for authentication and access control (e.g., unique account IDs, usernames, passwords, and so on), list entry data 124 that may define favorites lists associated with accounts, and profile data 126 that may correspond to personal pages accessible through a social networking service and/or other services 116. A variety of other data 128 is also contemplated, including service authorizations, user preferences, program files such as documents and spreadsheets maintained online, and other data typically associated with user accounts.

Service provider 102 is also depicted as storing a list sharing module 130 in memory 112 that is executable via the one or more processors 110 to implement aspects of favorite list sharing described herein. In an embodiment, functionality represented by the list sharing module 130 may be implemented as an application programming interface (API) that may be made accessible to the clients 104 over the network 108.

The one or more clients 104 are depicted as having one or more processors 132 and memory 134. Memory 134 is depicted as storing another list sharing module 130 that may be deployed to the client 104 and is executable via the one or more processors 132 to implement "client-side" aspects of favorites list sharing described herein. In an embodiment, functionality represented by the list sharing module 130 may be implemented as a script that is included with a webpage 118 provided by the service provider 102. Further discussion regarding the operation and configuration of one or more list sharing modules 130 in various embodiments may found in reference to the following figures.

To enable various communications over the network 108, the one or more clients 104 may also include a communication module 136. Communication module 136 is depicted as being stored in memory 134 and is also executable via the processor 132 to provide various interactions with service providers 102 and/or services 116. Examples of such interaction include, but are not limited to, communicating one to another, navigating content, searching webpages, accessing services 116, interacting with a social networking site, performing searches, instant messaging, e-mail, and so forth. Communication module 136 may be implemented as a browser or other suitable application to obtain and output webpages 118 from the service provider 102 over the network 108. Communication module 136 may also represent a component of another application used to obtain one or more services 116 from the service providers 102. For example, communication module 136 may be configured as a component of a desktop social networking application of a client 104.

As noted above, content selections associated with items in a favorites list may be obtained from third party sources, such as the one or more affiliate providers 106 depicted in the environment 100. The one or more affiliate providers 106 are depicted as having one or more processors 138 and memory 140. Memory 140 may store a variety of content 142 including content 142 that may be associated with items in a favorite list. Examples of content 142 that may be obtained for inclusion in a favorites list include album artwork, band images, book images, artist/author pictures, audio/video clips, descriptions, content metadata (e.g., dates, filenames, chapters, titles, author, notes, publisher, source), and so forth.

Content 142 of an affiliate provider may be identified via a corresponding affiliate item identifier 144. The affiliate item identifier 144 may be included with list entry data 124 that defines a favorites list. In this way, content 142 from the one or more affiliate providers 106 may be included in a favorites list exposed on webpages 118. The affiliate item identifiers 144 included with list entry data 124 may then be employed to share list items and corresponding content 144 between users.

Having considered devices and components of an example environment, consider now example procedures for favorites list sharing that may be implemented in the environment using the example components, as well as in other environments.

Example Procedures

The following discussion describes techniques for favorites list sharing that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference may be made to the example environment 100 of FIG. 1.

Figure 2:
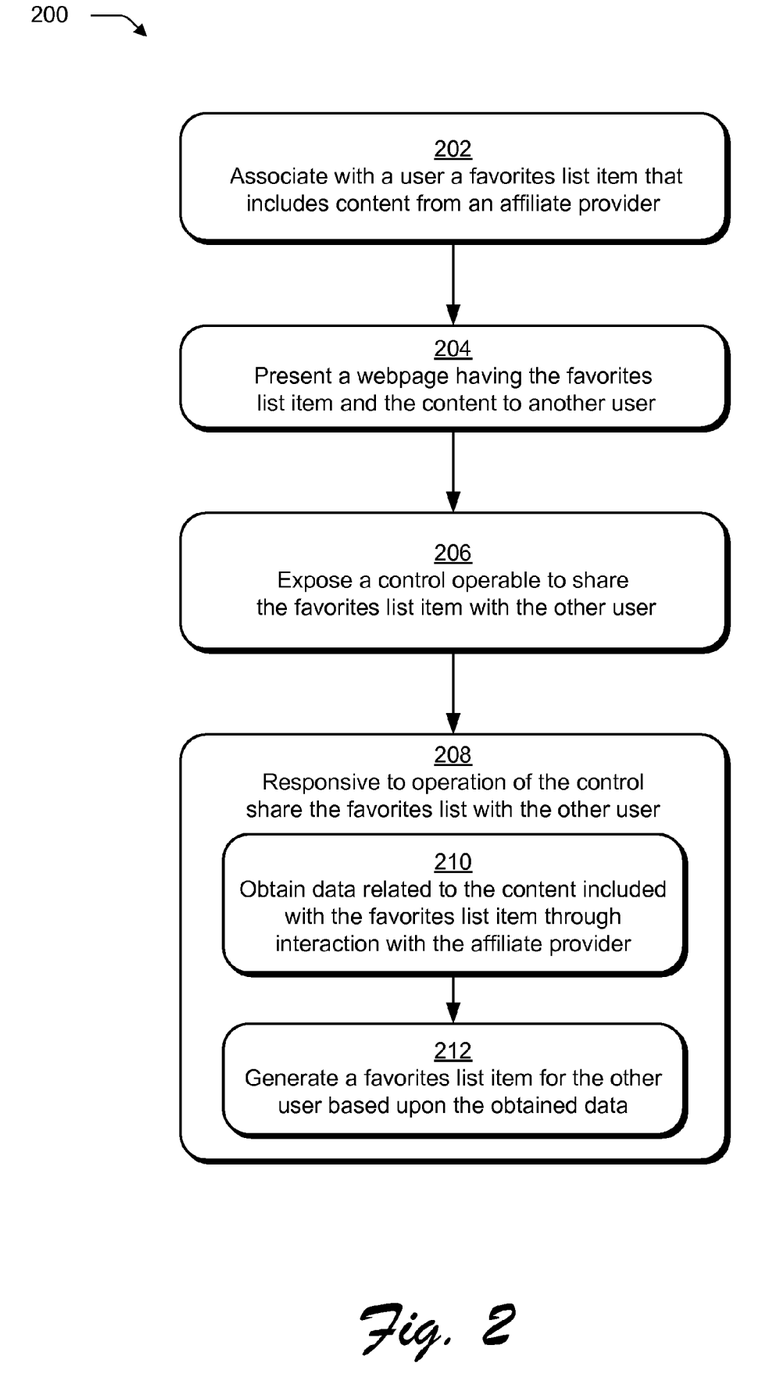
FIG. 2 is a flow diagram depicting a procedure in an example implementation in which a service provider enables favorites list sharing.

FIG. 2 depicts a procedure 200 in an example implementation in which a service provider enables favorites list sharing. In at least some embodiments, procedure 200 may be performed by a suitably configured service provider, such as service provider 102 of FIG. 1 having a list sharing module 130.

A favorites list item that includes content from an affiliate provider is associated with a user (202). For example, a user, such as Steve in the example above, may interact with a communication module 136 of a client 104 to obtain webpages 118 from a service provider 102. In at least some embodiments, the webpages 118 may be exposed in the course of Steve's interaction with a social networking service available from the service provider 102. Through interaction with the webpages 118, Steve may make selections to create a favorites list including the entry for "U2". This may include creating list items and associating the list items with content 142 that is available from one or more affiliate providers 106. For instance, Steve may use communication module 136 to interact with affiliate providers 106 to obtain an image of the band "U2" to include with a list entry. The favorites list of Steve may be defined by way of list entry data 124 that is stored with an account corresponding to Steve.

A webpage having the favorites list item and the content is presented to another user (block 204). For example, Tad (a friend of Steve's) may interact with a communication module 136 of a client 104 to obtain a webpage 118 that corresponds to a profile page of Steve's. The profile page may be configured to include Steve's favorites list having the entry for "U2". The favorites list entry for "U2" may be presented in the webpage 118 with the band image that Steve selected.

A control is exposed that is operable to share the favorites list item with the other user (block 206). In the above example, the webpage 118 obtained by Tad may include a control with the entry for "U2". The control may be configured in a variety of ways. For instance, the control may be a button, a selectable link, an icon, a menu item, or another suitable control exposed via the webpage 118. The control may be configured such that when Tad selects to control, the entry for "U2" created by Steve is shared with Tad. Thus, operation of the control by Tad may cause an entry for "U2" to be stored in association with a favorites list corresponding to Tad. In at least some embodiments, the control can be configured to cause sharing in response to a single-click and without further action by Tad. Accordingly, Tad may be able to continue to interact with the webpage 118 and/or other webpages without having to be interrupted.

In particular, responsive to operation of the control, the favorites list item is shared with the other user (block 208). To do so, data related to the content included with the favorites list item is obtained through interaction with the affiliate provider (block 210) and the favorites list item is generated for the other user based upon the obtained data (block 212). In the continuing example, responsive to operation of the control by Tad, a list sharing module 130 may operate to cause an associated list item to be shared with Tad. The list sharing module 130 may be operable by a client 104, by a service provider 102, and/or in combination thereof. Generally, list sharing module 130 operates in the background to recreate one or more selected list items responsive to interaction of a user with a suitably configured control.

In at least some embodiments, the list sharing module 130 may make use of list entry data 124 to perform the sharing. List entry data 124 may include, among other things, metadata associated with list items, affiliate item identifiers 144, content 142 and/or links to content that is associated with a list item, user comments, and so forth. In one example, one or more affiliate item identifiers 144 may be obtained from list entry data 124 that corresponds to a list item. The list sharing module 130 may cause communication over the network 108 with one or more affiliate providers 106 to obtain data related to content 142. In an example, the associated affiliate item identifiers 144 may be used to lookup content from the affiliate providers 106. Additionally or alternatively, uniform resource locators (URLs) and/or search data may be generated based on list entry data 124 to obtain corresponding data related to content 142 from one or more affiliate providers 106. Data related to content 142 may include the content 142 and/or various data that describes the content such as identifiers, links, navigation paths, storage locations, access permissions, content metadata, and so forth.

In the above example, list entry data 124 corresponding to the "U2" entry created by Steve may be employed to obtain a band image of "U2" selected by Steve for the entry. List sharing module 130 may then operate to generate a list entry for Tad that corresponds to the "U2" entry authored by Steve. One way this may occur is by adding to list entry data 124 that corresponds to an account of Tad's with a service provider 102 to recreate the list item as authored by Steve. The list entry data 124 that is added may be configured based upon data obtained from the affiliate provider 106.

For instance, a list entry may be generated to include content 142 that is obtained from the affiliate provider 106. Additionally or alternatively, the list entry may incorporate various data that describes the content 142 and/or enables to content 142 to be retrieved in conjunction with rendering a corresponding favorites list for a webpage 118. As noted above, creation of the list item can occur without action of a user apart from selection of the control. Thus, in the above example, Tad is able to continue interacting with various webpages 118. When Tad decides to view his own favorites list in a webpage 118, a "U2" entry may appear as it was authored by Steve.

Figure 3:
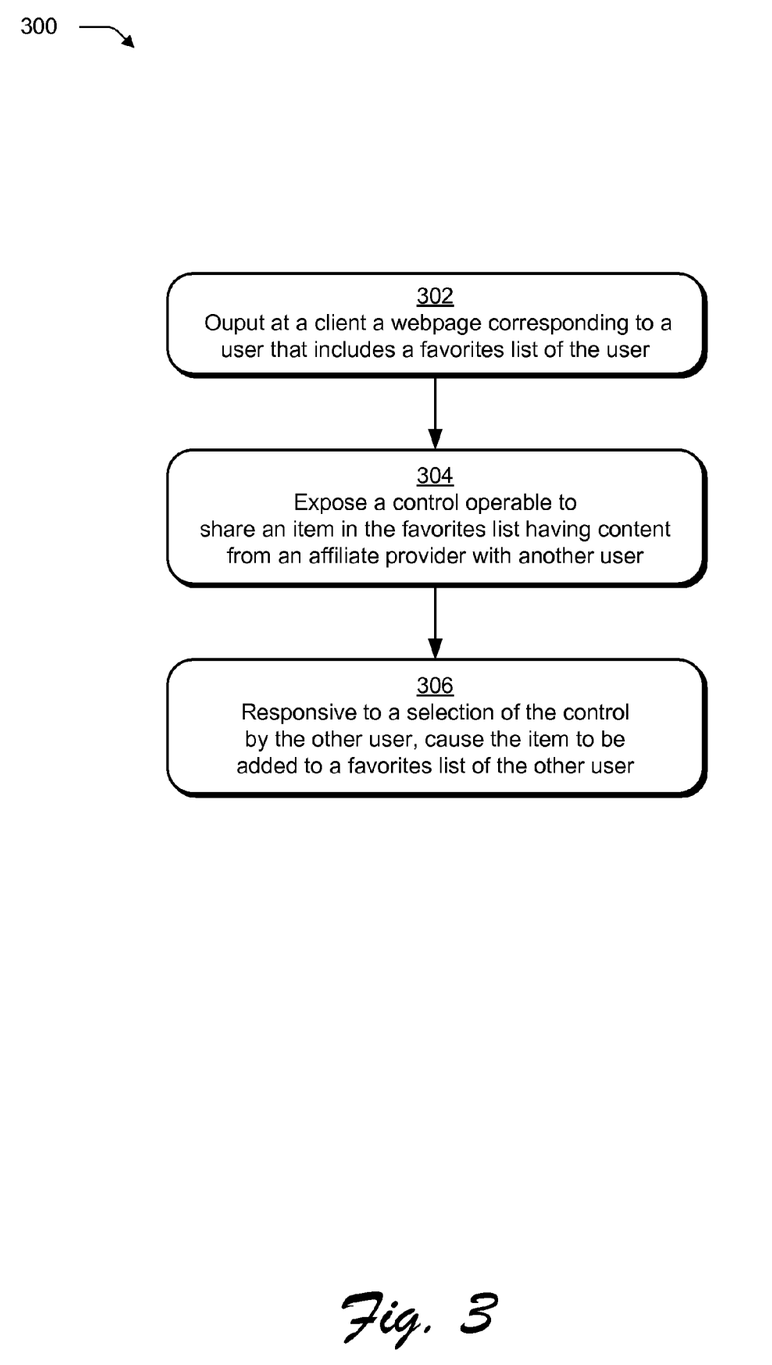
FIG. 3 is a flow diagram depicting a procedure in an example implementation in which a client causes sharing of a favorites list item.

FIG. 3 depicts a procedure 300 in an example implementation in which a client causes sharing of a favorites list item. In at least some embodiments, procedure 300 may be performed by a suitably configured client, such as a client 104 of FIG. 1 having a list sharing module 130.

As discussed in relation to FIG. 2, a client may output a webpage corresponding to a user that includes a favorites list of the user (block 302). The webpage may expose a control that is operable to share an item in the favorites list having content from an affiliate provider with another user (block 304). For example, a profile page or other page having the favorites list corresponding to Steve may be output by communication module 136 at a client 104 operated by Tad. One or more list items on Steve's profile page may appear with corresponding controls operable by Tad (or another user) to share the items.

Responsive to operation of the control, the client may be configured to cause the item to be added to a favorites list of the other user (block 306). In the preceding example, this may involve creating a list item and an association to content 142 via list entry data 124 that corresponds to an account of Tad with a service provider 102. One way this may occur is through operation of a list sharing module 130 that is executed at the client 104. Additionally or alternatively, selection of the control may cause communication over the network 108 by communication module 136 to cause execution of a list sharing module 130 of a service provider 102. In each case, list sharing module 130 is operable to obtain content 142 and/or associated data corresponding to a list item from one or more affiliate providers 106. List sharing module 130 is also operable to add a list item that includes, or is otherwise associated with, the obtained content 142. For instance, list sharing module 130 may update list entry data 124 associated with Tad's account to recreate the "U2" entry that was authored by Steve.

Figure 4:
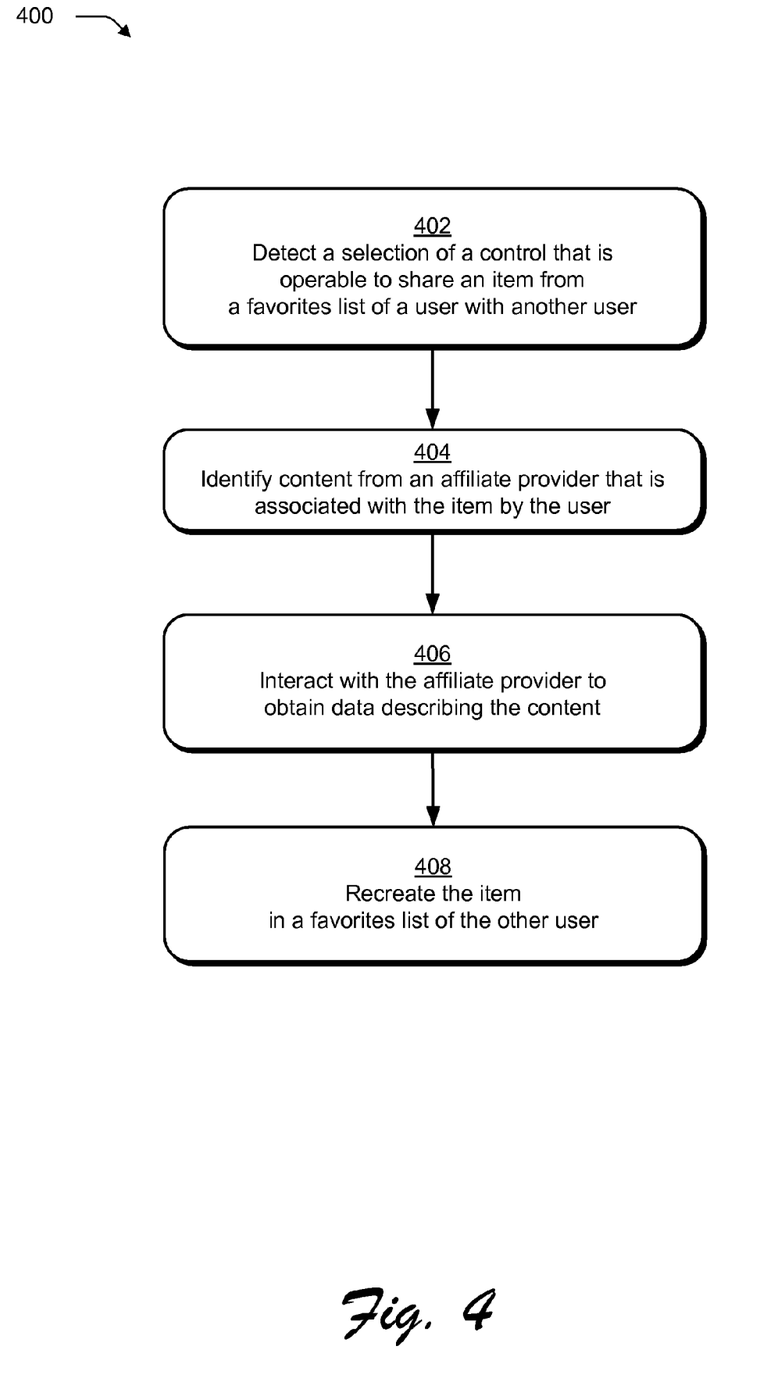
FIG. 4 is a flow diagram depicting a procedure in an example implementation in which interaction occurs with an affiliate provider to obtain content and/or related data to share a favorites list item.

FIG. 4 depicts a procedure 400 in an example implementation in which interaction occurs with an affiliate provider to obtain content and/or related data to share a favorites list item. In at least some embodiments, procedure 400 may be performed by a suitably configured module, such as list sharing module 130 that is associated with a client 104 and/or a service provider 102 of FIG. 1.

A selection is detected of a control that is operable to share a favorites list of a user with another user (block 402). In accordance with the previously discussed example, a profile page or other webpage 118 having a favorites list corresponding to Steve may be output by communication module 136 at a client 104 operated by Tad. When Tad selects a control exposed on the webpage 118 that is configured to share an item of Steve's favorites list, the selection of the control may be detected. One way this may occur is by operation of a suitably configured list sharing module 130. For instance, a call may be made to cause execution of the list sharing module 130 at a client 104 or at a service provider 102 in response to selection of the control.

Content from an affiliate provider is identified that is associated with the item by the user (block 404). As noted previously, content 142 that is associated with a list of items may have corresponding affiliate item identifiers 144. These affiliate item identifiers 144 may be included with list entry data 124 that defines a favorites list. In response to operation of the control to share an item, corresponding affiliate item identifiers 144 may be extracted from items appearing in the webpage 118. This may occur initially when the control is selected through operation of the communication module 136 and/or the list sharing module 130. In addition to affiliate item identifiers 144, list entry data 124 may include uniform resource locators (URLs) and/or search data that may be used to identify one or more affiliate providers 106. Thus, various identifying data may be employed to identify content 142 included by users with list items and/or corresponding affiliate providers 106.

In an embodiment, list sharing module 130 may be configured to perform a lookup on the accounts database 120 of a service provider 102 to obtain data that corresponds to a list item selected to be shared in response to selection of the control. In this embodiment, the list sharing module 130 may extract account data associated with the selected list item and a corresponding user account to perform the lookup. For example, list items authored by Steve and/or webpages 118 on which they appear may be associated with one or more unique identifiers that may be employed to lookup data corresponding to Steve in the accounts database 120. The account data used to perform such a lookup may be encrypted using various techniques to provide security. Naturally, trusted sources such as service providers 102 and/or list sharing module 130 may be capable of decrypting the account data to perform the lookup just described, to provide services 116, and so forth.

Using the various identifying data, interaction occurs to obtain data describing the content from the affiliate provider (block 406). In the continuing example, data suitable to identify an affiliate provider 106 as the source of the band image used by Steve to create his "U2" list entry may be obtained in response to Tad's selection to share this item. Through interaction with the affiliate provider 106, the band image and/or various data describing the band image may be obtained for inclusion in a favorites list corresponding to Tad.

In particular, list sharing module 130 may be configured to interact with one or more affiliate providers 106 to obtain content 142 and/or associated data describing the content 142. One way this may occur is by using the various identifying data that is obtained in block 404. In at least some embodiments, sharing module 130 may perform a lookup on the one or more affiliate providers 106 using the affiliate item identifiers 144 to obtain corresponding content 142. This may involve communicating requests for content 142 over the network 108 using the URLs from the list entry data 124. Additionally or alternatively, sharing module 130 may send a search request using search data to obtain corresponding content 142 from the one or more affiliate providers 106. In one example, content requests may be sent directly to individual affiliate providers 106. In another example, list sharing module 130 may interact with a service that is configured to look for content 142 that is available from the one or more affiliate providers 106. In each case, one or more affiliate providers 106 may return various data describing the content 142 (e.g., URLs, links and/or content locations to enable retrieval of the content, affiliate item identifiers 144, permissions, metadata) to the list sharing module 130 in response to the requests. Additionally or alternatively, the affiliate provider 106 may return the corresponding content 142.

The item is recreated as an item in a favorites list of the other user (block 408). In the preceding example, this may involve creating a list item for "U2" and an association to content 142 (e.g., the band image) via list entry data 124 that corresponds to an account of Tad with a service provider 102. The list item for Tad may be recreated to match the list item authored by Steve. To do so, the list item may be associated with the band image using data obtained through interaction with a corresponding affiliate provider 106.

For instance, list entry data 124 corresponding to a user may be configured to define a list item that is shared from another user. The content 142 and/or associated data that is obtained through interaction with an affiliate provider 106 may employed to associate the list item with the content 142. In at least some embodiments, content 142 may be included as part of the list entry data 124. Additionally or alternatively, the content 142 may be maintained in another storage location (e.g., a content store) and links, navigations paths, or other suitable data describing the content 142 may be included in the list entry data 124. The storage location may be network storage of the content provider 102, an affiliate provider 106, memory 134 of a client 104, or another suitable storage location.

Having considered examples procedures related to favorites list sharing, consider now example implementations of devices, modules, and user interfaces that may be employed to provide techniques for favorites list sharing in one or more embodiments.

List Sharing Implementation Examples

Figure 5:
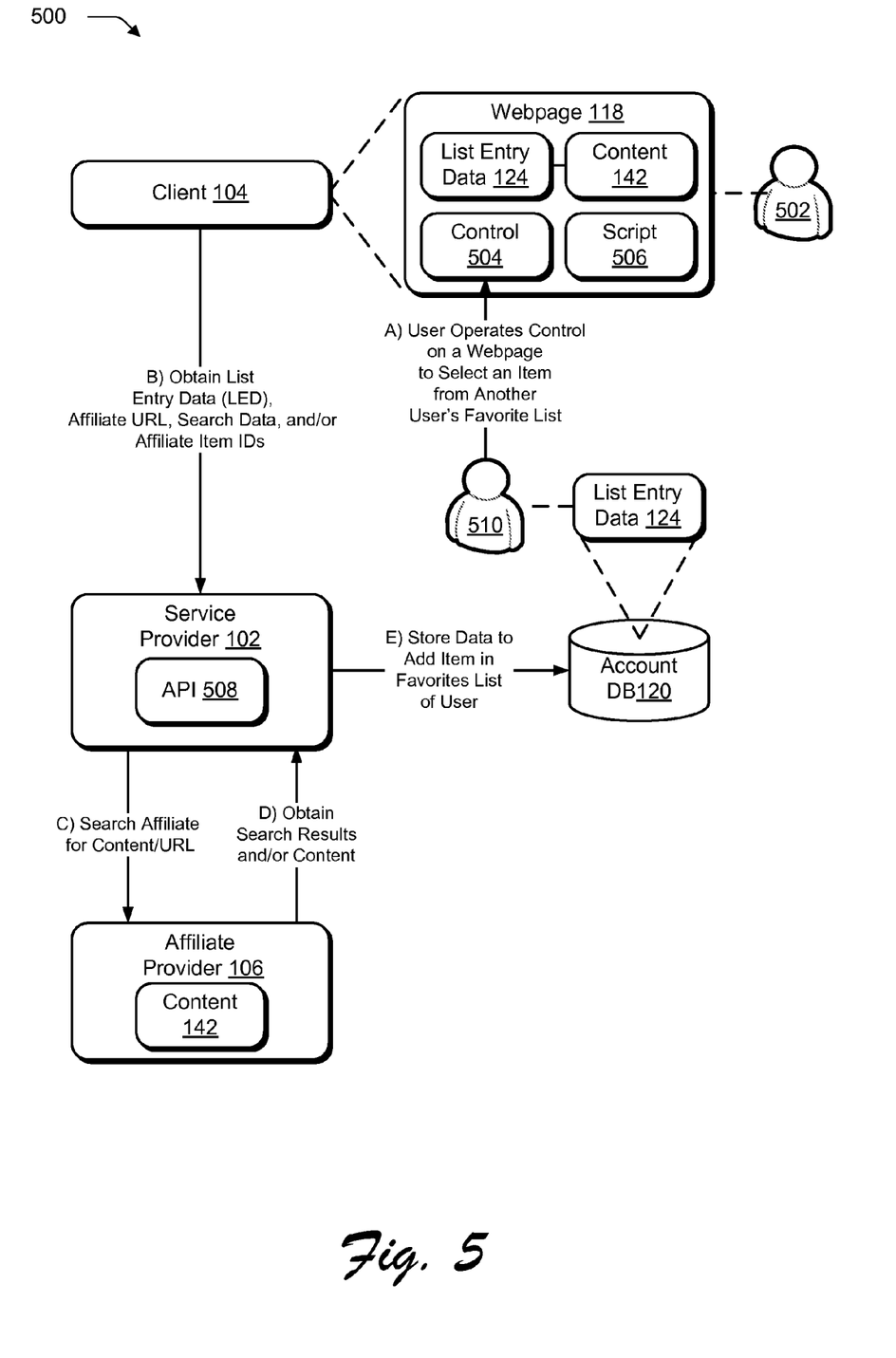
FIG. 5 illustrates a diagram of an example system depicting acts related to favorites list sharing in accordance with one or more embodiments.

FIG. 5 illustrates a diagram of an example system 500 depicting acts related to favorites list sharing in accordance with one or more embodiments. In the depicted implementation, a client 104 is illustrated as outputting a webpage 118 that corresponds to a user 502. The webpage 118 may include a favorites list of the user 502 that is based upon list entry data 124 and presents content 142 associated with entries in the list by the user 502. In this implementation the webpage 118 includes one or more controls 504 that may be operable to share items from the favorites list of the user 502 with other users. Further, the webpage 118 may be configured to implement the list sharing module 130 as script 506. The script 506 may be provided by service provider 102 to the client 104 in the webpage 118 to enable aspects of favorites list sharing described herein. Additionally or alternatively, a list sharing module 130 may be implemented as an application programming interface (API) 508 that is provided by and executed by the service provider 102. In this case, client 104 may be configured to make calls to the API 508 to cause favorites list sharing to occur. The functionality represented by the list sharing module 130 may also be executed in a distributed manner over a network 108 by one or more modules that are deployed to either or both of the client 104 and service provider 102.

FIG. 5 further depicts various acts that may occur in one or more embodiments of favorites list sharing. In act "A", a user 510 operates the control 504 on the webpage 118 to select an item from a favorites list of the user 502. This may cause execution of the script 506 and/or the API 508 to perform further acts in one or more embodiments of favorites list sharing. The further acts may occur by operation of one or more modules in response to a single user interaction with the control 504 (e.g., a single-click) and without further action on the part of the user 510.

In act "B", service provider 102 obtains various data to share the item selected by the user 510. This data may include list entry data 124, affiliate URLs, search data, and/or affiliate item identifiers 144. Service provider 102 may obtain the various data via operation of the API 508. Alternatively, the data may be communicated to the service provider 102 by execution of the script 506 at the client 104.

In act "C", the various data is employed to search one or more affiliate providers 106 for corresponding content 142. For instance, a lookup for content 142 may occur as discussed above in relation to FIG. 4. In act "D", search results and content 142 are obtained in response to the lookup. The content 142 may then be included with or otherwise associated with a list item that is created for the user 510 to correspond to the item selected from the webpage 118 of user 502. In act "E", data is stored to add the selected item to a favorites list associated with the user 510. In particular, list entry data 124 corresponding to the user 510 may be updated in an accounts database 120 to include an entry for the shared item from user 502. This may involve combining data describing list entries of user 502 obtained in act "B" with data related to content 142 obtained from an affiliate provider 106 in step "D" to generate corresponding list entries for user 510. A favorites list of the user 510 may then be configured to include the favorites item selected from the user 502 and the content 142 that was associated with the item by the user 502.

In an embodiment, the various acts depicted in FIG. 5 may be performed via the API 508 of the service provider 102. In another embodiment, the script 506 executed via client 104 may operate to search for and obtain content 142 through direct communication with the affiliate providers 106 and without the involvement of a service provider 102. Then, communication with the service provider 102 may occur to cause list entry data 124 of the user 510 to be updated to add the selected item. As noted, modules deployed to both a client 104 and a service provider 102 may also operate in conjunction to perform various acts and techniques for favorites list sharing described herein.

Figure 6:
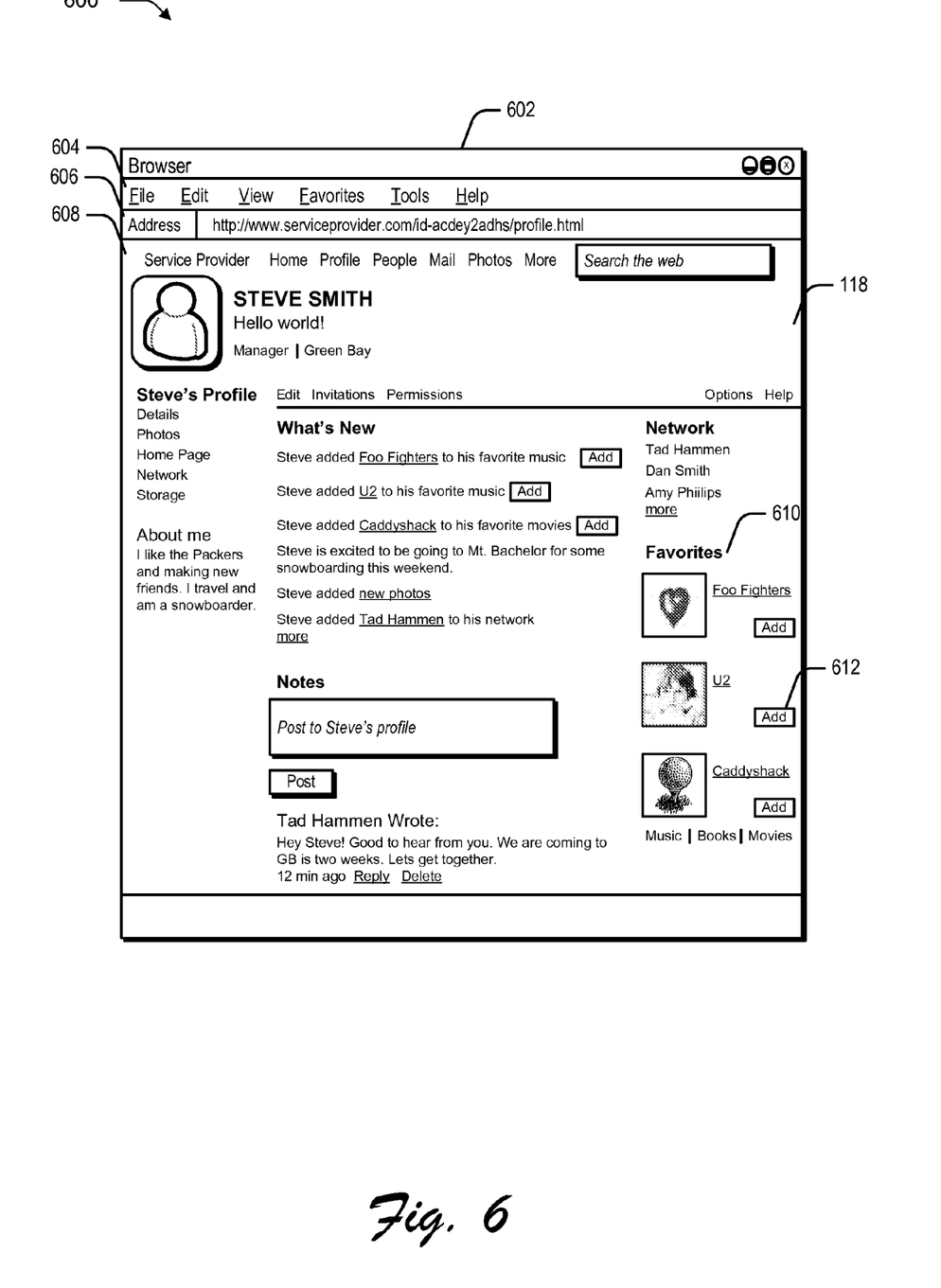
FIG. 6 is an illustration of an example web page configured to enable list sharing in accordance with one or more embodiments.

Referring now to FIG. 6, an implementation 600 is illustrated showing an example webpage 118 that is operable to share a favorites list item. The webpage 118 in this instance is illustrated as incorporated within a user interface 602 that may be provided by the communication module 136. For example, the communication module 136 may be configured as a browser operable to expose the user interface 602 to enable interaction with one or more service providers 102 and corresponding services 116. To provide the interaction with services 116, the user interface 602 includes a menu bar 604, an address bar 606, and a navigation bar 608. The menu bar 604 is a portion of the user interface 602 that includes drop-down menus of commands, examples of which are illustrated as "file", "edit", "favorites", "tools" and "help". The address bar 606 is configured to receive inputs to navigate to particular network addresses and/or display current network addresses, from which, the client 104 has received content that is being displayed. The navigation bar 608 may be operable to navigate to interact with a service provider 102 in various ways including selecting various services 116, searches for webpages 118, obtaining different webpages 118 corresponding to a social networking service, and so forth.

In the example of FIG. 6, the webpage 118 within the user interface 602 is configured as profile page for a user Steve that may be exposed via a social networking service or other service 116. Although depicted as being part of the user interface 602 of a browser, a user interface comparable to the webpage 118 may also be provided by standalone applications of the client 104, such as a desktop social networking application. In each case, the webpage 118 may make use of a list sharing module 130 to enable favorites sharing techniques discussed herein.

In particular, the webpage 118 includes a favorites list 610 to organize, present, and/or interact with a list of favorite items corresponding to the user Steve. In the depicted example, the favorites list includes favorite music entries for "Foo Fighters" and for "U2". A favorite movie entry for "Caddyshack" also appears. These list entries, as well as others, may be defined in an account corresponding to Steve via list entry data 124. As illustrated, Steve has associated an image with each of the entries. To do so, Steve may have selected images available from one or more affiliate providers 106. The list entry data 124 may include affiliate item identifiers 144 for each of the items. The affiliate item identifiers 144, as well as other suitable identifying data, may be employed for sharing the list items as previously discussed.

Note that a control 612 configured as an "Add" button appears with each entry. These controls 612 may be operable to share a corresponding list item. Thus, when Steve's friend Tad selects the "Add" button next to the "U2" entry, the "U2" entry and the associated band image selected by Steve will appear in Tad's favorites list via the techniques described herein. Controls 612 may also appear in other locations within the webpage 118, such as those depicted by entries in the "What's New" section. Further, sharing operations may also be accessible via items in the menu bar 604 and/or the navigation bar 608. In at least some embodiments, one or more controls 612 may be included in the webpage 118 that are configured to cause sharing of multiple favorites list items. For example controls such as a "Share All Music" control, "Share All Movies", and/or a "Share All" control may be exposed in addition to, or in lieu of, controls 612 appearing with each item. Thus, multiple items may be shared through operation of a single control 612.

Example Device

Figure 7:
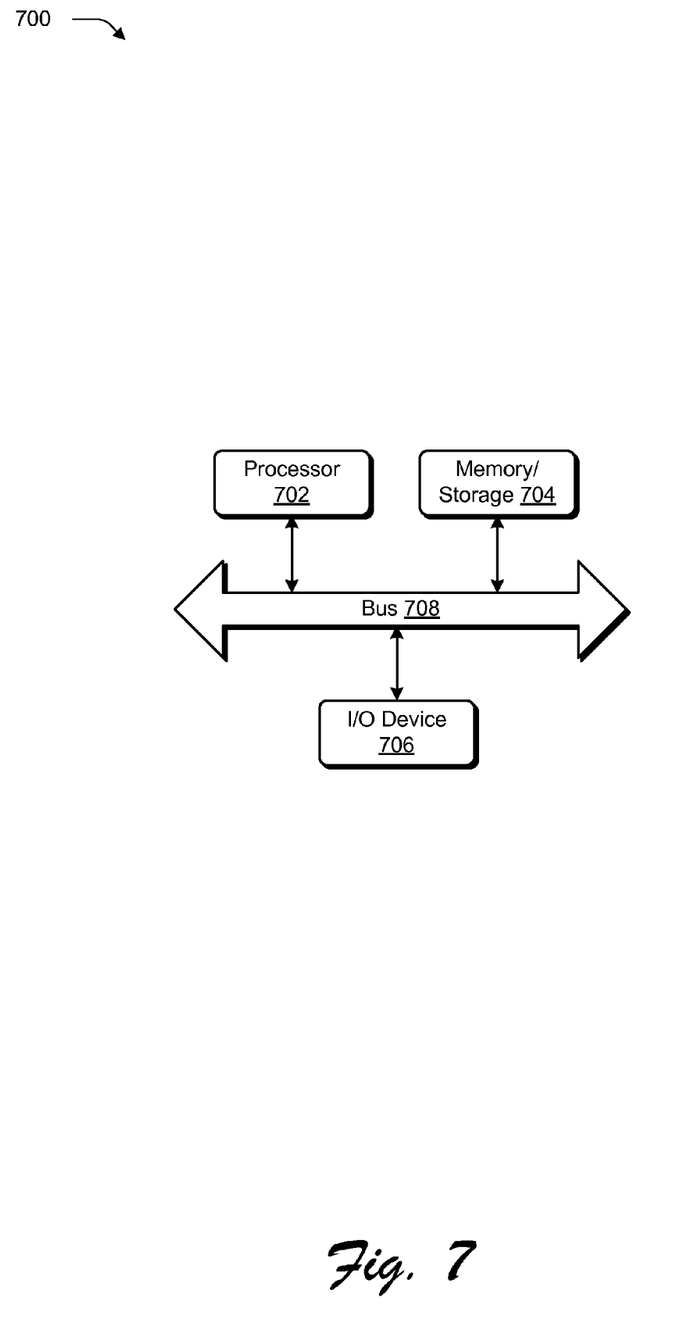
FIG. 7 is an illustration of an example device in accordance with one or more embodiments.

FIG. 7 illustrates an example computing device 700 that may implement the various embodiments described above. Computing device 700 may be, for example, a client 104 of FIG. 1, a server of a service provider 102, a server of an affiliate provider 106, or any other suitable computing device.

Computing device 700 includes one or more processors or processing units 702, one or more memory and/or storage components 704, one or more input/output (I/O) devices 706, and a bus 708 that allows the various components and devices to communicate one to another. The bus 708 represents one or more of several types of bus structures, including a memory bus or memory controller, a peripheral bus, an accelerated graphics port, and a processor or local bus using any of a variety of bus architectures. The bus 708 can include wired and/or wireless buses.

Memory/storage component 704 represents one or more computer storage media. Memory/storage component 704 may include volatile media (such as random access memory (RAM)) and/or nonvolatile media (such as read only memory (ROM), Flash memory, optical disks, magnetic disks, and so forth). Memory/storage component 704 may include fixed media (e.g., RAM, ROM, a fixed hard drive, etc.) as well as removable media (e.g., a Flash memory drive, a removable hard drive, an optical disk, and so forth).

One or more input/output devices 706 allow a user to enter commands and information to computing device 700, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer-readable media. Computer-readable media may include a variety of available medium or media that may be accessed by a computing device. By way of example, and not limitation, computer-readable media may comprise "computer-readable storage media".

Software or program modules, including the list sharing module 130, communication module 136, service manager module 114, and other program modules, may be embodied as one or more instructions stored on computer-readable storage media. Computing device 700 may be configured to implement particular functions corresponding to the software or program modules stored on computer-readable storage media. Such instructions may be executable by one or more articles of manufacture (for example, one or more computing device 700, and/or processors 702) to implement techniques for favorites list sharing, as well as other techniques. Such techniques include, but are not limited to, the example procedures described herein. Thus, computer-readable storage media may be configured to store instructions that, when executed by one or more devices described herein, cause various techniques for favorites list sharing.

Computer-readable storage media includes volatile and non-volatile, removable and non-removable media implemented in a method or technology suitable for storage of information such as computer readable instructions, data structures, program modules, or other data. Computer-readable storage media can include, but is not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or another tangible media or article of manufacture suitable to store the desired information and which may be accessed by a computer.

Conclusion

Although the favorites list sharing techniques have been described in language specific to structural features and/or methodological acts, it is to be understood that the appended claims are not necessarily limited to the specific features or acts described. Rather, the specific features and acts are disclosed as example forms of implementing the favorites list sharing techniques.

What is claimed is:

1. A method comprising:
presenting a favorites list that includes a favorites list item, that is authored by a user, with associated content from an affiliate provider in a webpage configured as a profile page of the user for a social networking service, wherein the associated content is selected from the affiliate provider by the user in conjunction with authoring the favorites list item and for presentation with the favorites list item in the profile page;
exposing a control operable to share the favorites list item with another user; and
responsive to operation of the control:
obtaining data from the affiliate provider that is related to the associated content presented with the favorites list item, including access permissions that enable the associated content to be accessed from the affiliate provider to recreate the favorites list item; and
recreating the favorites list item in a webpage configured as a profile page of the other user for the social network by generating a corresponding favorites list item for the other user based upon the obtained data, the corresponding favorites list item reproducing an appearance of the favorites list item as authored by the user including appearance of the associated content selected from the affiliate provider by the user.

2. A method as described in claim 1, wherein:
the data obtained from the affiliate provider includes the associated content; and
the generating of the corresponding favorites list item comprises storing data to describe the favorites list item including the obtained associated content.

3. A method as described in claim 1, wherein:
the data obtained from the affiliate provider includes data describing at least a location where the associated content is available; and
the generating of the corresponding favorites list item includes storing data to describe the favorites list item including a link to the location where the associated content is available.

4. A method as described in claim 1, further comprising providing script to a client with the webpage configured as the profile page of the user that is operable in response to selection of the control to cause the obtaining and generating.

5. A method as described in claim 1, further comprising exposing an application programming interface (API) that is callable by a client in response to operation of the control to cause the obtaining and generating.

6. A method as described in claim 1, wherein the webpage configured as the profile page of the user is accessible to the other user over a network.

7. A method as described in claim 1, wherein the webpage configured as the profile page of the user is a personal page of the user presented to the other user in conjunction with one or more services from a service provider.

8. A method as described in claim 1, further comprising enabling the user to configure the favorites list item to include the associated content from the affiliate provider through interaction with one or more services available from a service provider.

9. A method as described in claim 1, further comprising:
authenticating the other user to an account to provide access to one or more services from a service provider according to the access permissions; and
accessing the account to perform the generating of the corresponding favorites list item for the other user by storing data to define the corresponding favorites list item with the account.

10. A method as described in claim 9, wherein the data stored with the account to define the corresponding favorites list item includes the data related to the associated content that is obtained from the affiliate provider.

11. A method as described in claim 1, wherein operation of the control comprises a single-click.

12. A method as described in claim 1, wherein the associated content comprises one or more of an image, audio, video, a description of the content, and content metadata.

13. A client device comprising:
one or more processors; and
one or more computer-readable storage media storing instructions that, when executed by the one or more processors, cause the client device to:
output a webpage configured as a profile page of a user that includes a favorites list of the user listing items selected by the user as favorites within a social networking service;
expose a control to another user via the favorites list of the webpage configured as the profile page of the user that is operable to enable the other user to select that an item in the favorites list, that is presented with content from an affiliate provider to the other user, be recreated on a favorites list of the other user; and
responsive to interaction of the other user with the control:
obtain the content and related data from the affiliate provider, the related data including access permissions that enable the content to be accessed from the affiliate provider to recreate an item in a favorites list of the other user; and
add the item to the favorites list of the other user, the item that is added to the favorites list of the other user corresponding to an item that is selected to be recreated from the favorites list of the user, and including the content obtained from the affiliate provider.

14. A client device as described in claim 13, wherein the interaction with the control is a single-click.

15. A client device as described in claim 13, wherein the control is operable by the other user to recreate multiple list items in the favorites list of the user including said item by storing data to define each of the multiple list items with an account corresponding to the other user.

16. A client device as described in claim 13, wherein the webpage corresponds to a page of the user that is output at the client device through interaction of the other user over a network with the social networking service, wherein the social networking service is available from a service provider.

17. A system comprising:
one or more processors;
one or more computer-readable storage media storing instructions that, when executed via the one or more processors, cause the one or more processors to:
detect selection of a control that is located with one or more items in a favorites list on a webpage and is operable to share the one or more items in the favorites list that is created by a first user of a social networking service, wherein the one or more items are authored by the first user for display in the favorites list; and
responsive to the detection:
identify content from one or more affiliate providers that is associated by the first user with the one or more items as part of authoring the one or more items;
interact with the one or more affiliate providers to obtain data describing the content, including access permissions that enable the content to be accessed from the affiliate providers to recreate the one or more items in favorites lists;
recreate the one or more items in a favorites list of a second user of the social networking service that is presented as part of a webpage configured as a profile page of the second user, wherein the one or more items in the favorites list of the second user reproduce an appearance of the one or more items that results from the authoring, including appearance of the content that is associated with the one or more items as part of the authoring; and
associate the one or more items in the favorites list of the second user with the content based upon the obtained data.

18. A system as described in claim 17, wherein to associate the one or more items with the content comprises including the content with data stored to define the one or more items in the favorites list of the second user.

19. A system as described in claim 17, wherein:
to identify content that is associated with the one or more items comprises extracting identifiers corresponding to the one or more items from a webpage in which the favorites list is presented; and
to interact to obtain data describing the content comprises performing a lookup on the one or more affiliate providers using the extracted identifiers.

20. A system as described in claim 17, wherein to recreate the one or more items in a favorites list of the second user comprises:
extracting data defining the one or more list items through a lookup on an account associated with the first user; and combining the extracted data defining the one or more list items with the obtained data describing the content to create corresponding list items in the favorites list of the second user via an account associated with the second user.

\* \* \* \* \*